United States Patent [19]
Williams

[11] 3,771,542
[45] Nov. 13, 1973

[54] FLUID COMBINATION APPARATUS

[76] Inventor: Andrew Sinclair Williams, Brea, Calif.

[22] Filed: Dec. 4, 1972

[21] Appl. No.: 311,493

[52] U.S. Cl.......................... 137/93, 137/5, 137/113
[51] Int. Cl. .......................................... G05d 11/13
[58] Field of Search ................... 137/5, 88, 93, 112, 137/113, 551; 128/142.3, 145.5, 146.4, 188

[56] References Cited
UNITED STATES PATENTS

| | | | |
|---|---|---|---|
| 2,791,230 | 5/1957 | Schaschl............................. | 137/112 |
| 3,556,098 | 1/1971 | Kanwisher et al. ................ | 137/93 X |
| 3,592,215 | 7/1971 | Davis.................................. | 137/113 |
| 2,525,016 | 10/1950 | Borell ................................ | 137/93 X |

OTHER PUBLICATIONS
"Closed Cycle Breathing System Extends Diving Time," Design News, July 21, 1969, pages 14 & 15.

Primary Examiner—Robert G. Nilson
Assistant Examiner—Edward Look
Attorney—Raymond L. Madsen

[57] ABSTRACT

A first unidirectional fluid conducting device having a constant pressure output conducts fluid from a first fluid source to one input of a selector valve and a second unidirectional fluid conducting device having a constant pressure output conducts fluid from a second fluid source to another input of the selector valve. The selector valve is responsive to the pressure of the second fluid source for connecting the output of the first unidirectional fluid conducting device through the selector valve to the output thereof when the pressure of the second fluid source falls below a predetermined level. A shunt valve is connected between the inputs to the selector valve, the shunt valve being responsive to the pressure of the first fluid source for connecting together the inputs of the selector valve when the pressure of the first fluid source falls below a predetermined level. Therefore, fluid conduction to the output of the selector valve is assured from either one fluid source or the other. In addition, the selector valve is selectively operated to conduct fluid from either the first or the second fluid source in amounts as desired to obtain a predetermined combination of the first and second fluids in a fluid reservoir attached to the selector valve output. The input to the reservoir contains a Venturi mixing device to uniformly combine incoming fluids with the fluids within the reservoir. A portion of the mixed fluid is removed from the reservoir and conducted to a selective fluid detector which is sensitized to one of the fluids in the mixture. Control circuitry is attached to the detector to provide a signal to selectively operate the selector valve to conduct the required amounts of fluid from the first and second sources whereby the desired fluid combination and mixture is obtained.

15 Claims, 3 Drawing Figures

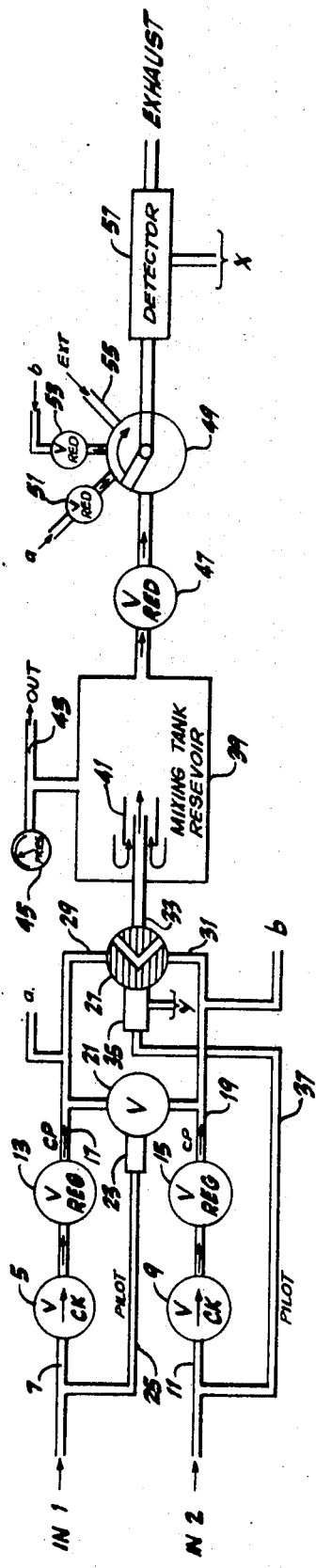
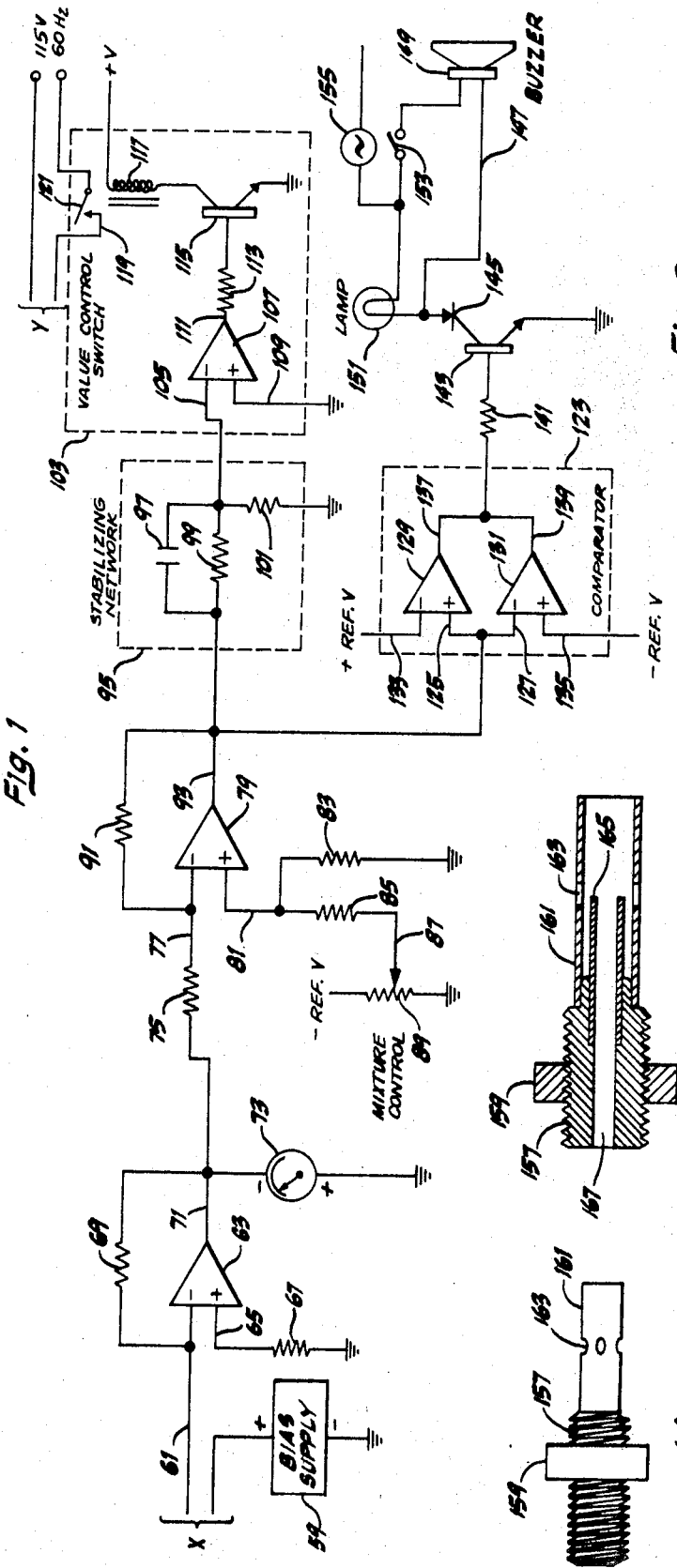
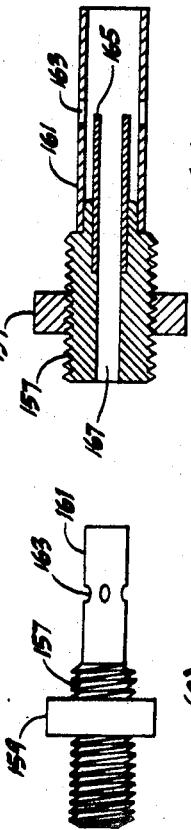

FLUID COMBINATION APPARATUS

The present invention relates to combining fluids in predetermined proportions and more particularly to the mixing of gases under pressure in accurately known concentrations for use with medical respirators and related equipment.

In the field of fluid combining and mixing, it has been the general practice to employ manually adjustable proportional controllers and automatically controlled systems of valves and conduits to control the concentration of a given fluid in a mixture of fluids. Although such devices have served the purpose, they have not proved entirely satisfactory under all conditions of service for the reason that considerable difficulty has been experienced in obtaining a required fluid flow in the absence or failure of one of the input sources of fluid being mixed and difficulties encountered in accurately controlling the concentration of a particular fluid in the mixture.

When oxygen is mixed with air to provide an air enriched mixture for use with respirators, it has been the general practice to utilize pressure operated valves and mechanical controllers to control the mixture. These valves and controllers have not been entirely satisfactory for the reason that the oxygen concentration is often in excess of that desired with resulting irreversible tissue damage to the patient. Further, if the equipment fails, it is common to lose both the supply of oxygen and air resulting in loss of a breathing environment to the patient.

Those concerned with the development of life support systems and respirators have long recognized the need for a fail safe automatically controlled system in which the subject is assured of a breathing environment under conditions of partial or total failure of the controlling apparatus. The present invention fulfills this need.

One of the most critical problems confronting designers of breathing systems and medical respirators has been the provision of accurate automatic control of adjustably mixed breathing gases. This problem is overcome by the present invention.

Prior fluid blending systems have utilized ratio controllers which are responsive to flow controllers for maintaining a predetermined ratio between the flows of streams of fluids which are to be combined, as illustrated in U. S. Pat. No. 3,124,148. Here, an analyzer is used to continuously measure a property of the blend stream, such as refractive index, and to control the ratio of the streams blended in response to this analysis. THe analyzer operates to reset the ratio controller as may be necessary to maintain the composition of the blended stream constant at a predetermined value. Further, the streams are delivered to a vessel wherein mechanical propellers agitate the blend in order to obtain uniform mixing. However, in this type of system, loss of one of the fluid streams results in the ratio controller shutting off the remaining stream and opening the valve full to the failed stream which in turn results in the failure of any fluid reaching the mixing chamber or reservoir. The present invention overcomes this difficulty.

A gas analyzer controlled gas mixing apparatus is illustrated in U. S. Pat. No. 3,465,753 for the controlled application of an anesthesia to a patient. An ultraviolet analyzer controls the actuation of valves and a pump for the accurate introduction of halophane into the patient's breathing supply. However, should the supply of oxygen fail or the control apparatus fail, there is no "fail-safe" operation of the apparatus to insure that the patient does not obtain an excessive amount of anesthesia or the lack of a life supporting breathing environment. The present invention overcomes this problem.

An artificial atmosphere system as described in U. S. Pat. No. 3,215,057 in which pressure sensors are used to indicate the partial pressure of oxygen and total pressure of a gas mixture delivered to a life support system. The pressure sensors are used to control valves at the inlets from oxygen and nitrogen sources. There are no "fail-safe" features provided to guarantee a minimal life supporting atmosphere nor are there any mixing devices to provide a reliable mixture of the combined gases. The present invention overcomes these deficiencies.

In U. S. Pat. No. 3,256,900, there is illustrated an electrochemical sensing unit in a control system to provide a relatively simple and reliable system for regulating the concentration of a depolarizer gas in a given gas mixture. The sensing unit utilized contains two cells which generate a voltage varying with the oxygen partial pressure in the gas to which the cathode of each cell is exposed. The cells are connected together electrically opposing each other and the potential voltage differential is measured. It is necessary that the cells be operated under a pulse current load to overcome uncontrollable variations of internal resistance of each cell as well as those due to temperature changes of the conductivity of cell contacts and leads. The present invention overcomes these problems.

The general purpose of this invention is to provide a fluid mixing and control system which embraces all the advantages of similarly employed fluid mixing and control systems and possesses none of the aforedescribed disadvantages. To attain this, the present invention contemplates a unique arrangement of conduits and pressure sensitive valves whereby failure of the system to provide at least one of the input sources of fluid to an output mixing reservoir is avoided. In addition, the present invention utilizes a unique mixing device in the mixing reservoir in order to avoid unmixed pockets of fluid and erroneous indications of mixture therefrom. Furthermore, the present invention contemplates a unique control system in which a polarographic selective detector is employed whereby uncontrolled variations of internal resistance are avoided.

An object of the present invention is the provision of the "fail-safe" mixing of fluids by assuring the connection of the system to one of the remaining sources of fluid should the other sources fail.

Another object is to provide the thorough mixing of combined fluids in a mixing reservoir.

Yet another object of the present invention is the provision of a fluid selection process whereby one or another of two fluid inputs are alternately selected automatically to provide a predetermined mixture of the fluids in a mixing reservoir.

A still further object is to provide the automatic mixing of oxygen and air in a predetermined accurate concentration independent of line pressure and flow variations.

A still further object of the invention is the provision of the automatic mixing of oxygen and air with the "fail-safe" provision of supplying pure oxygen should the air supply fail or air should the oxygen supply fail.

Still yet another object of the present invention is the provision of automatic mixing of oxygen in air in preset proportions controlled by a polarographic sensor for use in a respirator for medical application.

Other objects and many of the attendant advantages of this invention will be readily appreciated as the same becomes better understood by reference to the following detailed description when considered in connection with the accompanying drawings in which like reference numerals refer to like parts throughout the figures thereof and wherein:

FIG. 1 shows a mechanical block diagram of a preferred embodiment of the invention;

FIG. 2 illustrates a schematic diagram of the electronic control portion for the embodiment illustrated in FIG. 1; and FIGS. 3 (a) and (b) illustrate a plan view and section view, respectively, of a preferred embodiment of a Venturi mixing device utilized in the mixing tank of FIG. 1.

Turning now to FIG. 1, conduit 7 connects a source of fluid connected to IN 1 to check valve 5 which in turn is connected to regulator valve 13 having a constant pressure output connected to conduit 17. Similarly, conduit 11 connects a second source of fluid connected to IN 2 to check valve 9 which in turn is connected to regulator valve 15 having a constant pressure output connected to conduit 19. Conduits 17 and 19 are connected through valve 21 which is normally closed and which is opened by pressure mechanism 23 attached thereto and further connected to pilot conduit 25 which is connected to conduit 7 when the pressure in conduit 7 drops below a predetermined level. Selector valve 27 has one input 29 connected to conduit 17 and another input 31 connected to conduit 19 and further has mechanism 35 connected thereto which in turn is connected to conduit 11 through pilot conduit 37. Mechanism 35 has a solenoid portion connected to a pair of electrically conducting leads through which the solenoid is operated to connect input 31 to output 33 of selector valve 27. Mechanism 35 further has a pressure operated section which is actuated when the pressure in conduit 11 drops below a predetermined level to direct selector valve 27 to connect input 29 to output 33 thereof. When the solenoid portion of mechanism 35 is not operated, input 29 is normally connected to output 33 of connector valve 27. Output 33 of selector valve 27 is connected to Venturi mixing device 41 in mixing tank or reservoir 39. Reservoir 39 has one output connected to conduit 43 which is also connected to a pressure indicator 45. Conduit 43 conducts the mixture from reservoir 39 for distribution. Another output of rservoir 39 is connected to reducing valve or small orifice 47 which in turn is connected to an input of selector valve 49. Selector valve 49 has another input thereto connected to reducing valve or small orifice 51 which in turn is connected by conduit a to conduit 17. Another input to selector valve 49 connected to reducing valve or small orifice 53 which in turn is connected through conduit b to conduit 19. Another input to selector valve 49 is connected an external source of fluid through input 35. Selector valve 49 connects any one of the aforementioned inputs through an output thereof to detector 57 which in turn is connected to an exhaust port. Detector 57 has a pair of electrically conducting leads x across which can be measured an electrical parameter proportional to the concentration of a specific fluid in the mixture of fluids directed thereto from reservoir 39.

Referring now to FIG. 2, bias supply 59 is connected between circuit ground and one of the pair electrical leads x of detector 57 the other lead being connected to inverting input 61 of operational amplifier 63, non-inverting input 65 of amplifier 63 being connected through resistor 67 to circuit ground. Resistor 69 is connected from inverting input 61 to output 71 of operational amplifier 63, output 71 being further connected to meter 73 which in turn is connected to circuit ground. Output 71 of operational amplifier 63 is further connected through resistor 75 to inverting input 77 of operational amplifier 79, non-inverting input 81 of amplifier 79 being connected through resistor 83 to circuit ground. Non-inverting input 81 is further connected through resistor 85 to adjustable arm 87 of potentiometer 89. Potentiometer 89 is connected between a negative source of reference voltage (−REF. V) and circuit ground. Inverting input 77 of amplifier 79 is further connected through resistor 91 to output 93 of amplifier 79, which in turn is connected to stabilizing network 95 and to comparator 123.

Stabilizing network 95 has capacitor 97 connected in parallel with resistor 99, the parallel combination being connected between output 93 of amplifier 71 and one end of resistor 101, the other end of resistor 101 being connected to circuit ground. The junction of capacitor 97, resistor 99, and resistor 101 is further connected to valve control switch 103 WHICH includes operational amplifier 107, transistor 115 and solenoid 117. Non-inverting input 105 of amplifier 107 is connected to the junction of capacitor 97, resistor 99 and resistor 101, inverting input 109 of amplifier 107 being connected to circuit ground. Output 111 of amplifier 107 is connected through current limiting resistor 113 to the base of NPN transistor 115, the emitter of which is connected to circuit ground. The collector of transistor 115 is connected through solenoid 117 to a source of plus voltage (+V). Fixed contact 119 of solenoid 117 is connected to one of the pair of electrically conducting leads Y connected to the solenoid of mechanism 35, the other of the pair of leads being connected to one side of a source of 115 V 60 Hz. The other side of the 115 V 60 Hz is connected to moving contact 121 of solenoid 117.

Comparator 123 contains operational amplifiers 121 and 131, non-inverting input 125 of amplifier 129 being connected to inverting input 127 of amplifier 131 and further connected to output 93 of amplifier 79. Inverting input 133 of amplifier 129 is connected to a plus reference voltage (+REF. V) and non-inverting 135 of amplifier 131 is connected to a negative reference voltage (−REF. V). Output 137 of amplifier 129 is connected to output 139 of amplifier 131 and is further connected through current limiting resistor 141 to the base of NPN transistor 143 having the emitter thereof connected to circuit ground. Collector of transistor 143 is connected to the cathode of diode 145 the anode of which is connected to one lead of lamp 151 and to lead 147 of buzzer 149. The other lead of lamp 151 is connected through source 155 to circuit ground. The junction of source 155 and lamp 151 is further connected through switch 153 to the other lead of buzzer 149.

Turning now to FIG. 3(a), there is shown a side plan view of a preferred embodiment of mixing device 41 of FIG. 1. The device shown is cylindrical in nature having a threaded section 157 upon which is threaded nut 159 by which it is secured in reservoir 39 of FIG. 1 A smooth cylindrical section 161 has holes 163 centrally located thereon around its circumference.

Referring now to FIG. 3(b), there is illustrated a cross sectional view of the preferred embodiment of FIG. 3(a). Interior to the cylindrical section 161 is centrally located a coaxial cylindrical conduit section or nozzle 165 which is attached to threaded section 157 and having its open end terminating approximately in the vicinity of holes 163. Opening 167 is coaxially located interior to and traverses threaded section 157 and continues through the center of nozzle 165 into the interior of cylindrical section 163.

Operation of the invention can best be described by turning to FIG. 1 where two fluid inputs are respectively connected to IN 1 and IN 2. The fluid connected to IN 1 is directed through check valve 5 and regulator valve 13, check valve 5 preventing undesirable backflow and regulator valve 13 providing fluid at constant pressure to conduit 17 and to inlet 29 of selector valve 27. Similarly, the fluid connected to IN 2 flows through conduit 11 through check valve 9 and regulator 15, check valve 9 preventing undesirable backflow and regulator valve 15 providing a constant pressure flow into conduit 19 equal to that in conduit 17 thereby operating inlet 31 and inlet 29 of selector valve 27 at constant and equal pressures.

Selector valve 27 is of the solenoid operated pilot type, such as three-way valve, model No. 125A-3-11-20 manufactured by Humphrey. In the event that fluid pressure at IN 2 fails, selector valve 27 will automatically position itself to connect inlet 29 to outlet 33 to conduct gas from IN 1 to outlet 33. This is accomplished by sensing the pressure at IN 2 through pilot conduit 37 by mechanism 35 wherein the loss of pressure in pilot conduit 37 causes mechanism 35 to actuate selector valve 27 to switch inlet 29 to outlet 33. In the event of power failure, selector valve 27 also assumes the position connecting inlet 29 to outlet 33.

Shunt valve 21 is a presure operated normally open type valve and may be of the type such as the three-way valve used for selector valve 27. The fluid pressure provided through pilot conduit 25 to mechanism 23 prevents shunt valve 21 from opening and therefore, under normal conditions, with fluid pressure at IN 1, bypass valve 21 remains closed. If pressure fails at IN 1, valve 21 opens allowing the fluid from IN 2 to flow through valve 21 and through selector valve 27 to outlet 33 regardless of the position of selector valve 27. In this way, fluid is conducted to outlet 33 under all fault conditions except loss of all input fluid sources.

The fluid from outlet 33 of selector valve 27 enters Venturi mixing device 41 wherein the flow of fluid creates a Venturi pressure drop that forces the fluid from the interior and walls of the tank into the flowing stream of the Venturi mixing device to move and mix the contents of reservoir 39 with the incoming fluid. Therefore, the gas which is contained in reservoir 39 is thoroughly combined and mixed at pressure in the desired relative concentrations. Pressure indicator 45 provides an indication of the pressure in mixing tank or reservoir 39.

A continuous analysis of the fluid mixture in reservoir 39 is made by directing a small fluid flow through reducing valve or small orifice 47 which is connected by narrow bore pipe to mixing tank or reservoir 39 and to sample selector valve 49, which selects one of four low-flow rate inputs. Small orifice 47 substantially provides fluid at constant flow to selector valve 49. The output of selector valve 49 is directed into detector 57.

When gases such as oxygen and air are being mixed, detector 57 may be a polarographic detector similar to the type described in U. S. Pat. No. 2,913,386 wherein the concentration of oxygen in air is detected. In this application, the detector acts as a variable resistance, the resistance being substantially infinite with no oxygen concentration present in the mixture and decreases inversely proportional to the The of oxygen in the mixture. THe pair of leads $x$ provide connection to measure this electrical characteristic.

It should be noted that the bore diameters of the conduit lines from mixing tank or reservoir 39 to the detector are made small to minimize fluid transit time. The other sample inputs to selector valve 49 are for calibration and remote control of the fluid mixture. When the selector valve input is connected to reducing valve or small orifice 51, a sample of fluid from IN 1 through check valve 5 and regulator valve 13 is supplied through reducing valve 51 substantially at constant flow and through selector valve 49 to detector 57. Similarly, when the input of selector valve 49 is connected to reducing valve or small orifice 53, a sample of fluid connected to IN 2 is supplied substantially at constant flow to detector 57. Since the input pressures to reducing valve or small orifice 47, 51 and 53 are substantially the same and the reducing valves produce substantially the same flow rate, the detector experiences a constant and substantially equal fluid flow from any one of the positions. When the input to selector valve 49 is connected to input 55, an external sample can be analyzed from some remote part of any system to which the mixing apparatus is connected.

Although detector 57 has been described as a polarographic type, sensitive to oxygen when oxygen was one of the mixed fluids, the basic requirement is that the detector must be of a type sensitive to one of the two input fluids applied to IN 1 and IN 2 of the system. For example, when the fluid applied to IN 1 is oxygen and the gas applied to IN 2 is air or nitrogen, an oxygen sensor such as that described above would be employed. When mixing, for example, nitrogen, and carbon dioxide, either a carbon dioxide or nitrogen sensor could be used provided that the sensor chosen can operate independently within the environment of the other gas. In any event, the detector should produce an electrical signal or have an electrical characteristic which varies as some function of the concentration of one of the fluids in the mixture and which may be applied to an electronic control circuit.

Referring now to FIG. 2, there is set forth a typical circuit diagram of a control circuit that can be used with an oxygen polarographic detector or sensor described hereinbefore. It should be noted that other detectors are contemplated and input modifications of the amplifier circuit are anticipated depending on the type of sensor utilized. Where the sensors are sensitive to temperature variations, it will be necessary to provide compensation for these temperature variations. These techniques are well known to one skilled in the design of electronic circuitry. Bias supply 59 provides a bias to detector 57 such that a current flows through the detector inversely proportional to the resistance of the detector. The current flows through resistor 69 of operational amplifier 63 causing the voltage output of amplifier 63 to become negative with respect to circuit ground. Amplifier 63 can be of the integrated circuit type such as SN 72709L manufactured by Texas Instruments. Resistor 69 can be a thermistor to provide temperature compensation for the input sensor or detector.

Meter 73 is connected to the output of amplifier 63 to provide an indication of the percentage of the gas connected to In 1 in the mixture within mixture tank or reservoir 39. A comparison is now made between this electrical analog of gas concentration and an adjustable reference or "set-point" concentration provided by the voltage at adjustable arm 87 of potetiometer mixture control 89. Amplifier 79, which may be of the same type as amplifier 63, provides a current through resistor 75 proportional to the difference in the mixture voltage across meter 73 and the mixture control or "set-point" voltage at adjustable arm 87 of potentiometer 89. If the concentration of the gas at IN 1 provided to the reservoir 39 is greater than the valve set by the mixture control voltage of potentiometer 89, the voltage at the output of amplifier 63 will be lower than the reference voltage at adjustable arm 87 of potentiometer 89 causing a current to flow from the output of amplifier 79 through resistor 91 and resistor 75 thereby producing a positive error signal at the output of amplifier 79 which is applied through stabilizing network 95 to operational amplifier 107. Operational amplifier 107 may be of the same type as amplifier 63 and 79. The positive error signal in turn causes the output of amplifier 107 to be positive which in turn renders transistor 115 conductive thereby operating solenoid 117 and closing swinging contact 121 to fixed contact 119 thereof. Thus, the 115 V 60 Hz source is connected to the solenoid of mechanism 35 causing selector valve 27 to be placed into the position which connects input 31 to output 33, thereby providing fluid from IN 2 to the reservoir 39 to reduce the relative concentration of the fluid reservoir 39 received from IN 1. Therefore, a close loop regulator circuit has been established to control the concentration of the fluid mixture in reservoir 39.

Stabilization network 95 provides a phase lead to compensate for the lagging time constants of the fluid transit times through the conduits and the mixing tank as well as the time constant of the detector or sensor itself. The time constant of fluid transit can be minimized by using short conduit runs and small bore diameter conduits consistent with the requirements of adequate output flow. In its simplest form, the stabilization network can be a simple single time constant, phase lead circuit illustrated by the parallel combination of capacitor 97 and resistor 99 connected in series to the input of operational amplifier 107, the input being shunted by resistor 101 to circuit ground. Resistor 99 may be typically ten times the value of resistor 101 and the time constant CR of the combination of resistor 99 capacitor 97 should be no less than the longest time constant of any portion of the loop, which is usually the sensor or detector. In typical operation, the stabilizing network introduces an anticipatory signal to valve control switch 103 which is dependent on the rate of change of the relative fluid concentrations in reservoir 39.

An additional feature of the apparatus while not essential to the mixing function, provides visual and audible alarms when the fluid mixture falls outside of a predetermined interval. Operational amplifiers 129 and 131, which may be of the integrated circuit type such as Comparator SN 72711L manufactured by Texas Instruments, are connected to provide a dual level comparator 123 which delivers an output signal when either two preset reference potentials (one positive on inverting input 133 of amplifier 129 and one negative on non-inverting input 135 of amplifier 131) have been exceeded. Thus, when the potential at output 93 of amplifier 79 exceeds the plus reference voltage or falls below the negative reference voltage connected to comparator 123, the output of comparator 123 becomes positive and is applied through resistor 141 to transistor 143 rendering transistor 143 conductive which in turn turns on lamp 151 through diode 145 and when switch 153 is closed, also operates buzzer 149. Alternating supply 155 applies half cycles of an alternating signal to lamp 151 through diode 145. Diode 145 prevents conduction on the reverse or negative cycles of alternating source 155. An alternating source 155 is utilized to enable the application of an alternating current buzzer 149 for more reliable audible alarm operation. The buzzer may typically be one manufactured by Potter Brumfield, Model No. BU24AC. Transistor 143 may be of the NPN type 2N5449 manufactured by Texas Instruments. Switch 153 may be opened to eliminate the audible alarm when desired. In a typical application where the fluids are gases and the gas applied to IN 1 is oxygen and the gas applied to IN 2 is air, the preset reference voltages to comparator 123 would be set at ±5 percent oxygen error about the adjustable mixture set point. This means that the alarm lamp 151 and buzzer 149 are actuated whenever the oxygen concentration deviates greater ±5 percent from the mixture set point determined by mixture control potentiometer 89.

Turning now to FIG. 3(b), there is illustrated a cross sectional view of the Venturi mixing device 41 in reservoir 39 of FIG. 1. Gas entering opening or conduit 167 exits through inner cylindrical section or nozzle 165, where the gas stream flow causes a reduced pressure inside cylinder section 161 adjacent holes 163, thereby forcing fluid outside cylinder section 161 through holes 163 to intermingle with the stream of fluid flowing from nozzle 165. By this action, a positive mixing phenomenon is established to keep the gases within reservoir 39 in constant motion thereby providing a thorough mixing process and an accurate and reliable combining of the gases being mixed. This feature is desirable to avoid any erroneous indications in the mixing tank of the gas mixture which is directed to detector 57. Pockets of unmixed gas may cause detector 57 to indicate the need for providing more or less of one gas or the other where in fact the net concentration was that desired had the gases been thoroughly mixed. It should be noted by reference to FIG. 1 that selector valve 27 operates to either provide gas from one input or the other input and is not restricted to controlling the gas from a single input. Therefore, considerably faster changes in mixtures can be achieved and a wider control accomplished than in most prior art systems.

It now should be apparent that the present invention provides an automatic fluid mixing control system such as that which may be employed in conjunction with a respirator and related equipment for providing air enriched in oxygen where accurately known mixtures of air and oxygen are required for medical purposes. The need for accurate control of oxygen for medical applications is desirable in light of the toxic effects and irreversible tissue changes caused by excessive oxygen exposure. The present invention employs automatic feedback control in conjunction with actual analysis of a fluid mixture. In this respect it is markedly superior to earlier devices which rely on manual flow adjustment of the individual gases or upon pneumatic proportioning. The present invention is not sensitive or susceptible to variations in line pressure in output flow variations of the fluids. It is also possible to remote monitor the concentration on an external piece of equipment connected to the subject invention thereby compensating for leakage and other errors introduced by the connected equipment. When used with a respirator supplying a mixture of air and oxygen, accurate control and display of oxygen concentration at the present patient intake is accomplished.

Although particular components, etc., have been discussed in connection with a specific embodiment of fluid mixing apparatus constructed in accordance with the teachings of the present invention, others may be utilized. Furthermore, it will be understood that although an exemplary embodiment of the present invention has been disclosed and discussed, other applications and mechanical and electrical circuit arrangements are possible and that the embodiments disclosed may be subjected to various changes, modifications and substitutions without necessarily departing from the spirit of the invention.

What is claimed is:

1. Fluid combining apparatus comprising:
   first and second means, each having an input and an output for conducting fluid in one direction from said input to said output, means for maintaining the fluid at said output at substantially constant pressure, said inputs being adapted for connection to sources of fluid;
   shunt means connected between the outputs of said first and second means, said shunt means being responsive to the pressure of the fluid at said first means input for connecting together the outputs of said first and second means when the pressure of the fluid at said first means input falls below a predetermined level; and
   selector means having two inputs and an output for directing fluids from any one of said two inputs of said selector means to said output of said selector means, said two outputs of being connected respectively to the outputs of said first and second means, said selector means being responsive to the pressure of the fluid at said second means input for connecting said output of said first means to said selector means output when the pressure of the fluid at said second means input falls below a predetermined level.

2. The fluid combining apparatus described in claim 1 further comprising reservoir means having an input and at least one output, said input being connected to said selector means output for receiving and combining the fluids conducted by said selector means.

3. The fluid combining apparatus described in claim 2 further comprising mixing means within said reservoir means for substantially intermingling and dispersing the fluids uniformly throughout the confines of said reservoir means.

4. The fluid combining apparatus described in claim 3 further comprising means for producing substantially constant fluid flow connected to said at least one output of said reservoir means.

5. The fluid combining apparatus described in claim 4 further comprising:
   detector means connected to said means for producing constant fluid flow, said detector means generating an electrical signal in response to the amount of fluids received from said first means in said reservoir means; and
   electromechanical means attached to said selector means and said detector means, said electromechanical means being responsive to said detector means electrical signal for directing said selector means to connect said second means output to said selector means output whereby the fluid conducted by said second means is conducted through said selector means into said reservoir means when the fluids received in said reservoir means from said first means exceeds a predetermined concentration.

6. The fluid combining apparatus described in claim 5 wherein said detector means comprises:
   a fluid detector having a pair of electrical leads between which there is a resistance inversely proportional to the concentration of the fluids received in said reservoir means from said first means; and
   an electronic amplifier circuit connected to said pair of electrical leads, said amplifier having an output connected to said electromechanical means at which output said electrical signal is generated when said fluid detector resistance falls below a preselected magnitude, said amplifier having means for adjusting said preselected magnitude whereby the fluid mixture is controlled.

7. The fluid combining apparatus described in claim 6 wherein the fluids are gases and wherein said fluid detector comprises:
   a polarographic cell having electrolyte in which an anode and cathode are immersed, and a selective permeable barrier for separating said electrolyte from the gases being analyzed, said barrier being permeable to a specific gas whereby the gas enters the electrolyte and reacts therewith to change the resistance between said anode and cathode.

8. The fluid detecting apparatus in claim 7 wherein said specific gas is oxygen.

9. The fluid combining apparatus described in claim 6 further comprising a visual and audible alarm circuit connected to said electronic amplifier circuit, said visual and audible alarm circuit being activated to produce a visual and audible alarm when the concentration of the fluid received in said reservoir means from said first means falls outside of a predetermined interval.

10. The fluid combining apparatus described in claim 6 wherein said electronic amplifier comprises:
   a bias voltage supply having its positive terminal connected to one of said pair of electrical leads of said fluid detector;
   a first operational amplifier having its inverting input connected to the other of said pair of electrical leads of said fluid detector;
   a volt meter connected between the output of said first operational amplifier and circuit ground for indicating the concentration of the fluid received in said reservoir means from said first means;

a second operational amplifier having its inverting input coupled to the output of said first operational amplifier, said second operational amplifier having its non-inverting input connected to an adjustable source of reference voltage whereby the concentration of the fluid received in said reservoir means from said first means is adjusted;

a stabilizing network connected to the output of said second operational amplifier, said stabilizing network providing a leading phase angle to compensate for the phase lag of said fluid detector and of the fluid conducting paths; and a valve control switch connected to said stabilizing network for connecting a source of power to said electromechanical means attached to said selector means whereby said selector means is directed to connect said second means output to said selector means output when the fluid received in said reservoir means from said first means exceeds a predetermined concentration.

11. The fluid combining apparatus described in claim 10 wherein said electromechanical means is a solenoid and said selector means is a solenoid operated three-way valve.

12. The fluid combining apparatus described in claim 11 wherein said mixing means comprises:

a nozzle connected to the output of said selector three-way valve, said nozzle being mounted in the input to said reservoir means; and a cylindrical section of tubing coaxial with said nozzle and surrounding the opening of said nozzle in the interior of said reservoir means, said cylinder having openings in the circumference thereof adjacent the opening of said nozzle whereby the flow of fluid out of the opening of said nozzle forces fluids from the interior of said reservoir through said openings in said cylinder into the interior of said cylinder and into the fluid stream issuing from the opening in said nozzle whereby the mixing of the fluids entering from said nozzle are uniformly and thoroughly mixed with the fluids contained in said reservoir means.

13. The fluid combining apparatus described in claim 12 wherein said means for producing constant fluid flow comprises a reducing valve.

14. The fluid combining apparatus described in claim 13 further including a manual selector valve connected between said reducing valve and said detector for selecting one of a plurality of inputs for analysis by said fluid detector.

15. The fluid conducting apparatus as described in claim 14 wherein said stabilizing network comprises:

a capacitor;

a first resistor connected and parallel with said capacitor, one junction of said parallel combination forming the input to said stabilizing network and the other junction of said first resistor and capacitor being the output of said stabilizing network; and a second resistor connected from the output of said stabilizing network to circuit ground.

* * * * *